(12) United States Patent
Ito et al.

(10) Patent No.: US 10,722,794 B2
(45) Date of Patent: *Jul. 28, 2020

(54) VIDEO GAME PROCESSING PROGRAM, VIDEO GAME PROCESSING METHOD, AND VIDEO GAME PROCESSING SYSTEM

(71) Applicant: KABUSHIKI KAISHA SQUARE ENIX, Tokyo (JP)

(72) Inventors: Kazuki Ito, Tokyo (JP); Yuya Nagai, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,429

(22) Filed: Dec. 16, 2019

(65) Prior Publication Data

US 2020/0114259 A1   Apr. 16, 2020

Related U.S. Application Data

(63) Continuation of application No. 16/102,105, filed on Aug. 13, 2018, now Pat. No. 10,537,800.

(30) Foreign Application Priority Data

Nov. 30, 2017 (JP) ................................. 2017-230754

(51) Int. Cl.
*A63F 13/00* (2014.01)
*A63F 13/45* (2014.01)
(Continued)

(52) U.S. Cl.
CPC ............ *A63F 13/45* (2014.09); *A63F 13/213* (2014.09); *A63F 13/27* (2014.09); *A63F 13/428* (2014.09);
(Continued)

(58) Field of Classification Search
None
See application file for complete search history.

(56) References Cited

U.S. PATENT DOCUMENTS 9,329,309 B2 * 5/2016 Van Heugten ............ G02F 1/29
9,473,698 B2 * 10/2016 Muto .................. H04N 5/23229
(Continued)

FOREIGN PATENT DOCUMENTS

JP   04-204842   7/1992
JP   10-149089   6/1998
(Continued)

OTHER PUBLICATIONS

Office Action from Japan Patent Office (JPO) in Japanese Patent Appl. No. 2017-230754, dated Oct. 30, 2018, together with a partial English language translation.
(Continued)

*Primary Examiner* — Paul A D'Agostino
(74) *Attorney, Agent, or Firm* — Greenblum & Bernstein, P.L.C.

(57) ABSTRACT

A non-transitory computer-readable medium including a video game processing program product for causing a computer to realize functions to control progress of a video game on a basis of an operation of a controller by a user in a predetermined space including a display area is provided. Operation information, containing a position or a direction of the controller in the predetermined space, is obtained. In a case where the position or the direction of the controller is changed, a determination area is generated in a virtual space corresponding to the predetermined space on a basis of the operation information corresponding to the change. An image corresponding to a positional relationship between a determination target and the determination area is displayed in the display area.

12 Claims, 7 Drawing Sheets

(51) Int. Cl.
*A63F 13/428* (2014.01)
*A63F 13/213* (2014.01)
*A63F 13/537* (2014.01)
*A63F 13/27* (2014.01)
*A63F 13/814* (2014.01)
*A63F 13/52* (2014.01)

(52) U.S. Cl.
CPC ............ *A63F 13/52* (2014.09); *A63F 13/537* (2014.09); *A63F 13/814* (2014.09)

(56) References Cited

U.S. PATENT DOCUMENTS

| | | | |
|---|---|---|---|
| 9,651,360 | B1 * | 5/2017 | Fordham ............... G01B 11/002 |
| 9,712,738 | B2 * | 7/2017 | Van Heugten ..... H04N 5/23212 |
| 10,079,025 | B2 * | 9/2018 | Rolland ............. G10L 19/0212 |
| 2003/0063115 | A1 | 4/2003 | Kaku et al. |
| 2005/0202870 | A1 | 9/2005 | Kawamura |
| 2009/0132925 | A1 | 5/2009 | Koehler et al. |
| 2010/0042925 | A1 | 2/2010 | DeMartin et al. |
| 2010/0160045 | A1 | 6/2010 | Yamada et al. |
| 2012/0077589 | A1 | 3/2012 | Takehiro |
| 2013/0181901 | A1 | 7/2013 | West |

FOREIGN PATENT DOCUMENTS

| | | |
|---|---|---|
| JP | 2003-079943 | 3/2003 |
| JP | 2005-185740 | 7/2005 |
| JP | 2007-301048 | 11/2007 |
| JP | 2008-136695 | 6/2008 |
| JP | 2010-142561 | 7/2010 |
| JP | 2012-070781 | 4/2012 |
| WO | 2007/077851 | 7/2007 |

OTHER PUBLICATIONS

"Large movements turn into attack power! Start delivering and selling "Fitness" which you can enjoy fitness while playing games with Steam", iDEACLOUD, [online], Aug. 8, 2017, URL, https://ideacloud.co.jp/news/vr-fitness-release_170808.html, together with a partial English language translation.

1-10, Inc., "I can see something invisible. Get rid of Imadoki Hyakkiyako in Kyoto Gojo! Hyper VR • AR Attraction "Ghost hunter" held!", PR TIMES, [online], Sep. 5, 2017, URL, https://prtimes.jp/main/html/rd/p/000000018.000016942.html, together with a partial English language translation.

"Huis Ten Bosch and Square Enix collaborate! World's first experiential music attraction "Bahamut Disco" was born!", Huis Ten Bosch PR Release, [online], Feb. 27, 2017, URL, https://www.huistenbosch.co.jp/aboutus/pdf/170227_pr07.pdf, together with a partial English language translation.

VR Fitness, YouTube [online] [video], Jun. 23, 2017, URL, https://www.youtube.com/watch?v=M8A4LDGrcuE.

Otsugu, "[Experience report] "Ghost hunter" was a good VR / AR attraction that you can enjoy with your family", MoguraVR, [online], Sep. 26, 2017, URL, https://www.moguravr.com/obake-hunter-report/.

"Airtone play view: pure domestic air rhythm action, VR maniacs!", [online], Sep. 26, 2017, URL, https://vr-maniacs.com/entry/airtone/.

Office Action from Japan Patent Office (JPO) in Japanese Patent Appl. No. 2017-230754, dated Jun. 11, 2019, together with an English language translation.

* cited by examiner

VIDEO GAME PROCESSING PROGRAM, VIDEO GAME PROCESSING METHOD, AND VIDEO GAME PROCESSING SYSTEM

CROSS-REFERENCE TO RELATED APPLICATION

The present application is a continuation application of U.S. patent application Ser. No. 16/102,105, filed Aug. 13, 2018, which claims the benefit of Japanese Patent Application No. 2017-230754, filed Nov. 30, 2017. The disclosure of each of the above-identified applications, including the specification, drawings, and claims, is incorporated herein by reference in its entirety.

BACKGROUND OF THE INVENTION

1. Field of the Invention

At least one of embodiments according to the present invention relates to a non-transitory computer-readable medium including a video game processing program, a video game processing method, and a video game processing system for causing a computer to realize functions to control progress of a video game in a predetermined space including a plurality of display areas on the basis of an operation of a controller by a user.

Heretofore, various kinds of systems for causing a user to experience a virtual world have been proposed.

In such systems, there is a system in which video display apparatuses are respectively provided on a plurality of surfaces of a projection room and a video is projected on each of the video display apparatuses so as to be synchronized (see Japanese Patent Application Publication No. H4-204842).

In such a conventional system, it was general that an image can be changed in accordance with an operation input to a steering apparatus that is provided in a projection room. For example, in the system described above, a configuration in which development content of an image is changed by an operation of a viewer to a handle, an accelerator pedal, or a brake pedal provided in the steering apparatus is disclosed. However, in the configuration in which the steering apparatus is provided in the projection room, a feeling to move in a virtual space or the like may hardly be provided to a user sufficiently. Namely, a system in which a sense of immersion in the virtual space is heightened has been required.

SUMMARY OF THE INVENTION

It is an object of at least one of embodiments according to the present invention to solve the problem described above, and improve a sense of immersion in a virtual space of a user.

According to one non-limiting aspect of the present invention, there is provided a non-transitory computer-readable medium including a video game processing program product for causing a computer to realize functions to control progress of a video game on a basis of an operation of a controller by a user in a predetermined space including a plurality of display areas.

The functions include an obtaining function configured to obtain operation information, the operation information containing a position and a direction of the controller in the predetermined space.

The functions also include a generating function configured to generate, in a case where the position or the direction of the controller is changed, a determination area in a virtual space corresponding to the predetermined space on the basis of the operation information corresponding to the change.

The functions also include a determining function configured to determine a positional relationship between a determination target and the determination area that are arranged in the virtual space.

The functions also include a displaying function configured to display an image corresponding to a determination result in the display area.

According to another non-limiting aspect of the present invention, there is provided a video game processing method of controlling progress of a video game on the basis of an operation of a controller by a user in a predetermined space including a plurality of display areas.

The video game processing method includes an obtaining process configured to obtain operation information, the operation information containing a position and a direction of the controller in the predetermined space.

The video game processing method also includes a generating process configured to generate, in a case where the position or the direction of the controller is changed, a determination area in a virtual space corresponding to the predetermined space on the basis of the operation information corresponding to the change.

The video game processing method also includes a determining process configured to determine a positional relationship between a determination target and the determination area that are arranged in the virtual space.

The video game processing method also includes a displaying process configured to display an image corresponding to a determination result in the display area.

According to still another non-limiting aspect of the present invention, there is provided a video game processing system for controlling progress of a video game on a basis of an operation of a controller by a user in a predetermined space including a plurality of display areas. In this case, the video game processing system includes a communication network, a server, and a client.

The video game processing system includes an obtaining unit configured to obtain operation information, the operation information containing a position and a direction of the controller in the predetermined space.

The video game processing system also includes a generating unit configured to generate, in a case where the position or the direction of the controller is changed, a determination area in a virtual space corresponding to the predetermined space on the basis of the operation information corresponding to the change.

The video game processing system also includes a determining unit configured to determine a positional relationship between a determination target and the determination area that are arranged in the virtual space.

The video game processing system also includes a displaying unit configured to display an image corresponding to a determination result in the display area.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like did not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like did not occur in the content of the processing.

First Embodiment

Figure 1:
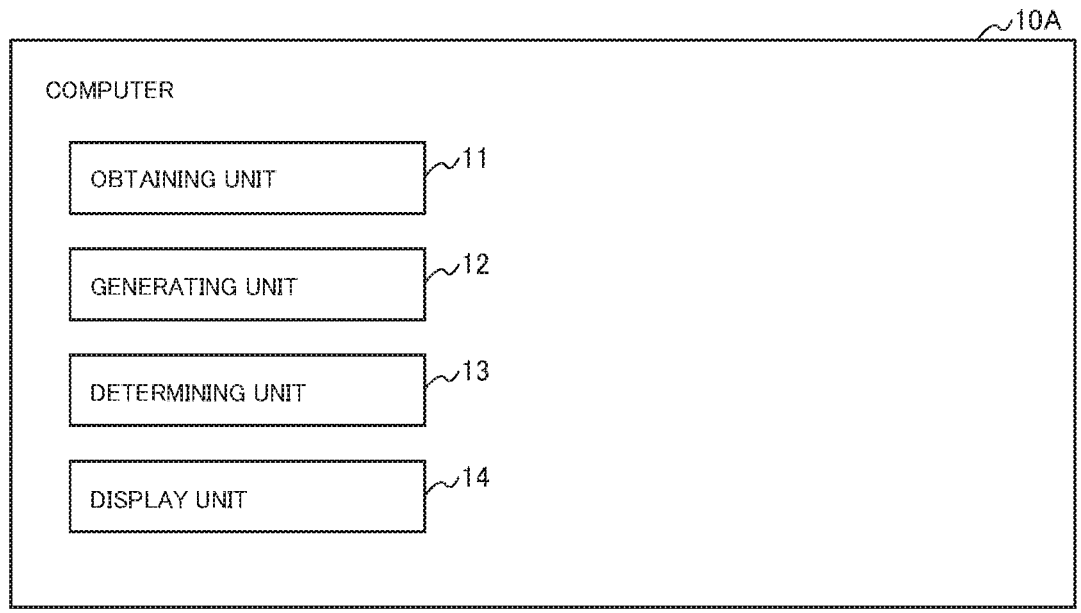
FIG. 1 is a block diagram showing an example of a configuration of a computer corresponding to at least one of embodiments according to the present invention.

FIG. 1 is a block diagram showing a configuration of a computer 10A, which is an example of a computer 10 according to one embodiment of the present invention. As shown in FIG. 1, the computer 10A is configured to control progress of a video game in a predetermined space including a plurality of display areas on the basis of an operation of a controller by a user. The computer 10A at least includes an obtaining unit 11, a generating unit 12, a determining unit 13, and a display unit 14.

Here, the display area means an area in which an image can be displayed. A configuration of the display area is not limited particularly, and may be an area in which an image can be displayed. As examples of the display area, there are a screen corresponding to a projector, and a display configured to receive image information from the computer 10A.

Further, the predetermined space including the plurality of display areas means a reality space provided with a plurality of display areas. A configuration of the predetermined space is not limited particularly. However, it is preferable that the configuration is a configuration in which at least a part of a virtual space corresponding to the predetermined space is displayed on the plurality of display areas so as to be synchronized with each other. As an example of the predetermined space, there is a booth that has such a size that a plurality of users can enter it and is surrounded by four walls. Namely, it is preferable that the predetermined space is configured so that the user is allowed to experience the virtual space in the space by means of a plurality of display areas and one virtual space. In this regard, each of the plurality of display areas may be configured so as to constitute a closed space. Alternatively, each of the plurality of display areas may be configured by a dome wall. In this case, it is preferable that each of the plurality of display areas is configured by a dome wall and a floor. However, display of the floor may be omitted.

The obtaining unit 11 has a function to obtain operation information that contains a position and a direction of the controller in a predetermined space.

Here, a configuration to obtain the operation information is not limited particularly so long as a change in the position and the direction of the controller can be grasped. As an example of such a configuration, there is a configuration in which a position and a direction of a controller are specified by one or more sensor provided in a predetermined space.

The generating unit 12 has a function to generate, in a case where the position or the direction of the controller is changed, a determination area in a virtual space corresponding to a predetermined space on the basis of the operation information corresponding to the change.

Here, the phrase "operation information corresponding to the change" means information indicating a change in the position and/or the direction of the controller. As an example of such information, there is information that indicates a change from start to end.

Further, the virtual space corresponding to the predetermined space means a virtual space corresponding to a real space. A configuration of the virtual space is not limited particularly. However, it is preferable that the virtual space is a space having the same shape as that of the predetermined space. As an example of the virtual space, there is one in which a position of a controller is converted into a three-dimensional coordinate.

Further, the determination area means a virtual area used for predetermined determination. A configuration of the determination area is not limited particularly. However, it is preferable that the configuration is a configuration in which the user can recognize a determination area to which a user operation is reflected. As an example of the three-dimensional area, there is a three-dimensional closed area.

The determining unit 13 has a function to determine a positional relationship between a determination target and the determination area that are arranged in the virtual space.

Here, a configuration to arrange the determination target in the virtual space is not limited particularly. However, it is preferable that the configuration is a configuration in which a plurality of determination targets is arranged in accordance with progress of the video game. As an example of such a configuration, there is a configuration in which a determination target is generated at a position or on a movement path, which is determined on the basis of a predetermined rule, in the virtual space.

Further, the configuration to determine the positional relationship is not limited particularly. However, it is preferable that the configuration is a configuration in which the user can recognize a determining method thereof. As an example of such a configuration, there is a configuration in which the determination target and the determination area are displayed in the display area and determination of whether to match positions thereof or not is carried out.

The display unit 14 has a function to display an image corresponding to a determination result in the display area.

Here, a configuration of the image corresponding to the determination result is not limited particularly. However, it is preferable that the configuration is a configuration in which the user can recognize a determination result. As an example of such a configuration, there is a configuration in which an image according to a type of determination result is displayed.

Next, an operation of the computer 10A according to the present embodiment will be described.

Figure 2:
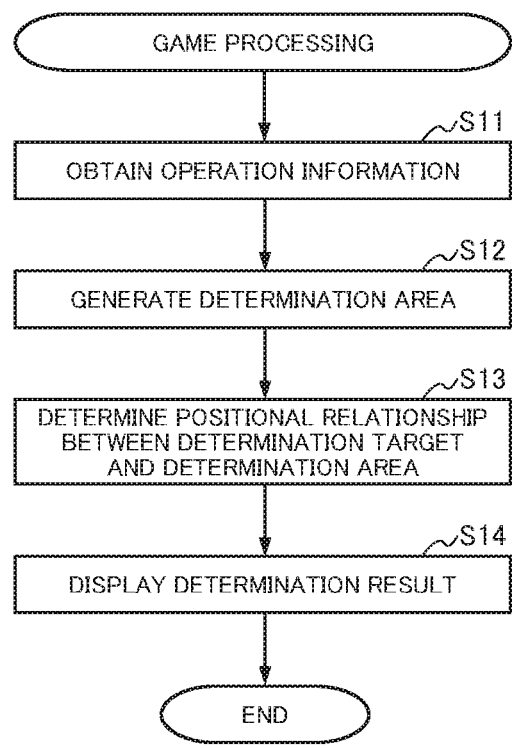
FIG. 2 is a flowchart showing an example of game processing corresponding to at least one of the embodiments according to the present invention.

FIG. 2 is a flowchart showing an example of game processing carried out by the computer 10A. The game processing is started when the user satisfies a start condition of the video game, for example.

In the game processing, the computer 10A first obtains operation information (Step S11). In the present embodiment, the computer 10A obtains operation information containing a position and a direction of a controller at regular intervals.

When the operation information is obtained, the computer 10A generates a determination area (Step S12). In the present embodiment, in a case where the operation information satisfies a generation condition, the computer 10A generates the determination area on the basis of the operation information.

When the determination area is generated, the computer 10A determines a positional relationship between the determination target and the determination area (Step S13). In the present embodiment, the computer 10A determines whether the determination target that are arranged in the virtual space comes into contact with the generated determination area or not.

When the positional relationship is determined, the computer 10A displays an image corresponding to a determination result in a display area (Step S14), and terminates the processing herein.

As explained above, as one side of the first embodiment, the computer 10A provided with functions to control progress of the video game on the basis of the operation of the controller by the user in the predetermined space including the plurality of display areas is configured so as to include the obtaining unit 11, the generating unit 12, the determining unit 13, and the display unit 14. Thus, the obtaining unit 11 obtains the operation information that contains the position and the direction of the controller in the predetermined space; the generating unit 12 generates, in a case where the position or direction of the controller is changed, the determination area in the virtual space corresponding to the predetermined space on the basis of the operation information corresponding to the change; the determining unit 13 determines the positional relationship between the determination target and the determination area that are arranged in the virtual space; and the display unit 14 displays the image corresponding to the determination result in the display area. Therefore, it is possible to improve a sense of immersion in the virtual space.

Namely, a state of the virtual space in which the operation of the controller in the predetermined space, in particular, movement of the controller is reflected is displayed in the plurality of display areas that constitutes the predetermined space. For this reason, it is possible to provide a sense of immersion in the virtual space to the user who operates the controller in the predetermined space.

Second Embodiment

Figure 3:
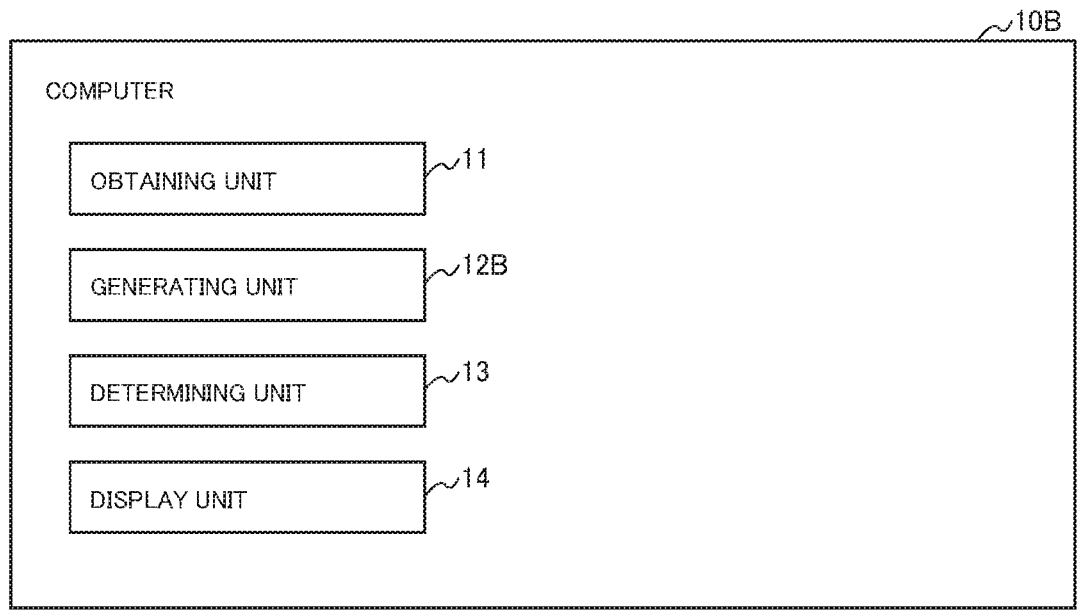
FIG. 3 is a block diagram showing an example of a configuration of a computer corresponding to at least one of the embodiments according to the present invention.

FIG. 3 is a block diagram showing a configuration of a computer 10B, which is an example of the computer 10 according to one embodiment of the present invention. In the present embodiment, the computer 10B at least includes an obtaining unit 11, a generating unit 12B, a determining unit 13, and a display unit 14.

The generating unit 12B has a function to generate a determination area with a shape corresponding to a locus of a change in a position or a direction of a controller or.

Here, a configuration to generate the determination area with the shape corresponding to the locus is not limited particularly. However, it is preferable that the configuration is a configuration in which the corresponding shape is specified on the basis of at least one of the position and the direction of the controller. As an example of such a configuration, there is a configuration in which an area of a predetermined range that is defined on the basis of a coordinate according to the position and the direction of the controller is specified as the determination area.

Figure 4:
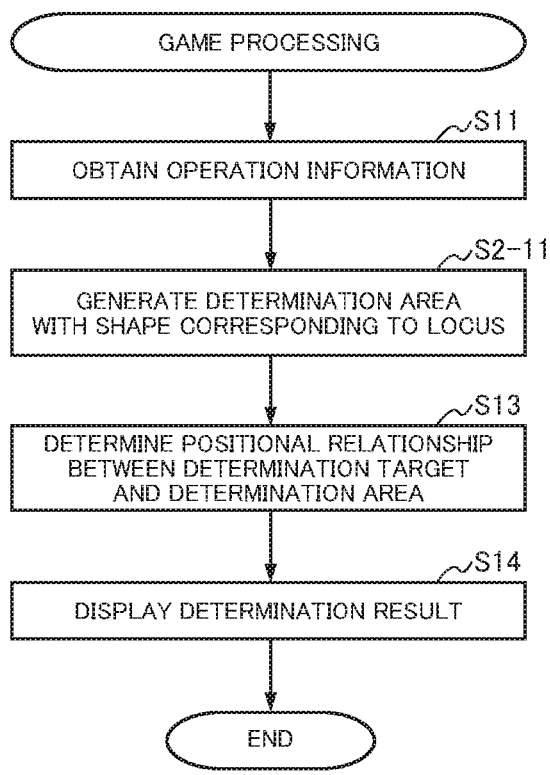
FIG. 4 is a flowchart showing an example of game processing corresponding to at least one of the embodiments according to the present invention.

FIG. 4 is a flowchart showing an example of the game processing carried out by the computer 10B. When operation information is obtained, the computer 10B generates a determination area with a shape corresponding to a position of a controller or a locus of a direction on the basis of the obtained operation information (Step S2-11). In the present embodiment, the computer 10B generates the determination area with the shape corresponding to the locus of the change in a case where the operation information indicates movement of the controller (that is, the change in the position or the direction of the controller).

As explained above, as one side of the second embodiment, the computer 10B is configured so as to include the obtaining unit 11, the generating unit 12B, the determining unit 13, and the display unit 14. Thus, the generating unit 12B generates the determination area with the shape corresponding to the locus of the change in the position or the direction of the controller. Therefore, by realizing the video game that the user can play intuitively, it is possible to further improve a sense of immersion in the virtual space.

Third Embodiment

Figure 5:
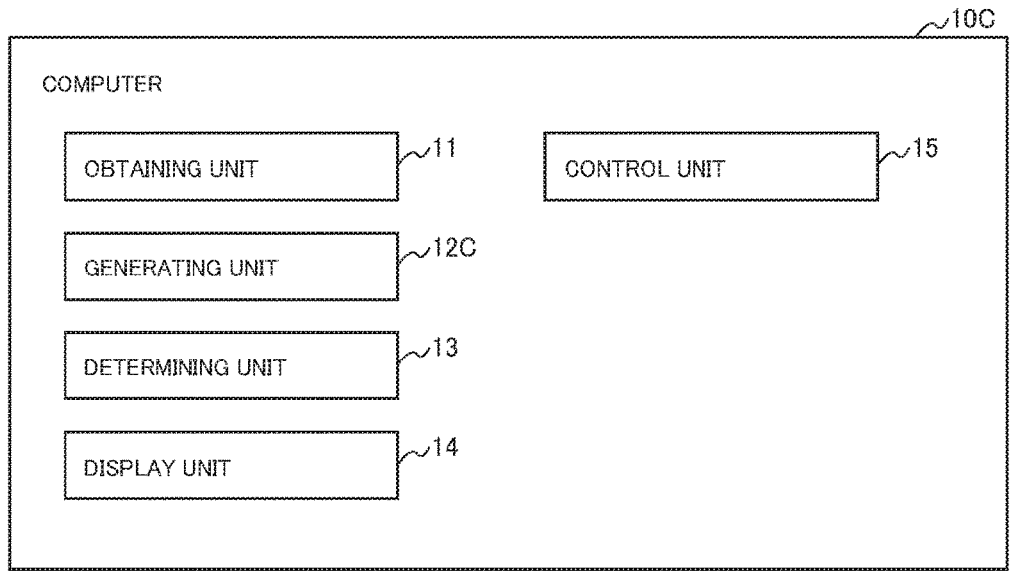
FIG. 5 is a block diagram showing an example of a configuration of a computer corresponding to at least one of the embodiments according to the present invention.

FIG. 5 is a block diagram showing a configuration of a computer 10C, which is an example of the computer 10 according to one embodiment of the present invention. In the present embodiment, the computer 10C at least includes an obtaining unit 11, a generating unit 12C, a determining unit 13, a display unit 14, and a control unit 15C.

The control unit 15C has a function to control a position of a determination target in accordance with progress of a video game.

Here, the phrase "in accordance with progress of the video game" means that occurrence of various kinds of progress or changes and the like that can be generated in the video game becomes timing or a standard of the processing of specifying. As an example of the processing of specifying, there are a determining process, an information updating process and the like. Further, as examples of the various kinds of progress or changes that can be generated in the video game, there are progress of time, a change in the game element value, a specific status or update of a flag, an operation input by the user, and the like.

Further, the phrase "control a position of a determination target" means various kinds of controls, such as a control to generate a determination target at a specific position, a control to move a determination target from a certain position to another position, and the like.

The generating unit 12C has a function to generate a determination area that is generated and maintained for a predetermined period of time from the generation.

Here, the phrase "in accordance with progress of the video game" means that occurrence of various kinds of progress or changes and the like that can be generated in the video game becomes timing or a standard of the processing of specifying. As an example of the processing of specifying, there are a determining process, an information updating process and the like. Further, as examples of the various kinds of progress or changes that can be generated in the video game, there are progress of time, a change in the game element value, a specific status or update of a flag, an operation input by the user, and the like.

Further, the phrase "maintained for a predetermined period of time from the generation" means that the determination area can influence on a virtual space only for a predetermined period of time after the determination area is generated by the generating unit 12C and occurs in the virtual space. A configuration to maintain the determination area for a predetermined period of time is not limited particularly. For example, it may be configured so that anew determination area can be generated in a situation that one determination area is maintained.

Figure 6:
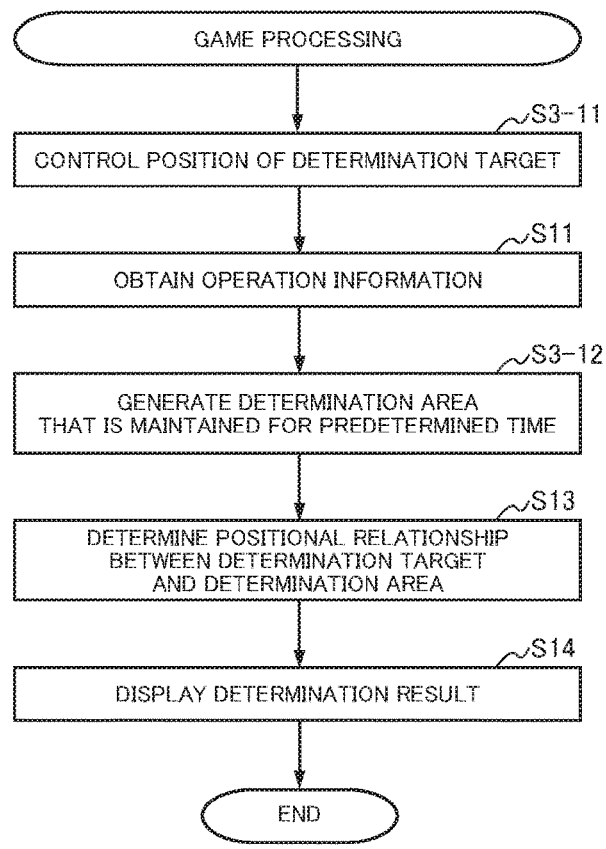
FIG. 6 is a flowchart showing an example of game processing corresponding to at least one of the embodiments according to the present invention.

FIG. 6 is a flowchart showing an example of the game processing carried out by the computer 10C. When the game processing is started, the computer 10C controls a position of a determination target (Step S3-11). In the present embodiment, the computer 10C controls a position of each of a plurality of determination targets from start to end of the video game.

When the position of the determination target is controlled and operation information is obtained, the computer 10C generates a determination area that is maintained for a predetermined period of time (Step S3-12). In the present embodiment, the computer 10C generates the determination area corresponding to a movement locus of a controller in the virtual space only for a fixed period of time.

As explained above, as one side of the third embodiment, the computer 10C is configured so as to include the obtaining unit 11, the generating unit 12C, the determining unit 13, the display unit 14, and the control unit 15C. Thus, the control unit 15C controls the position of the determination target in accordance with progress of the video game; and the generating unit 12C generates the determination area that is generated and maintained for a predetermined period of time from the generation. Therefore, it is possible to provide the user for a video game in which a determination area can be generated before the determination target moves to a certain position, and it is possible to improve interest in or the taste of the video game. This makes it possible to further improve a sense of immersion in the virtual space.

Fourth Embodiment

Figure 7:
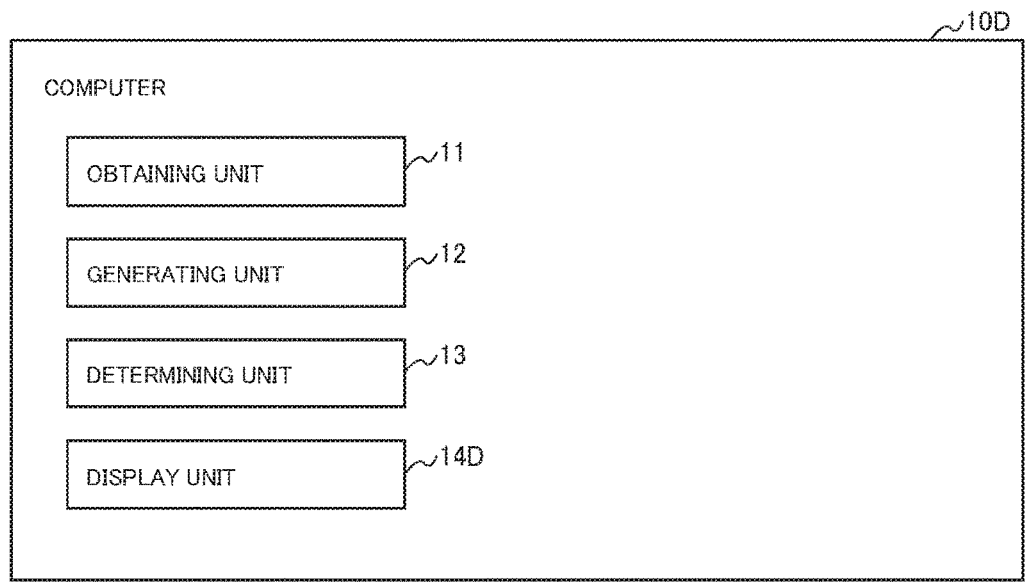
FIG. 7 is a block diagram showing an example of a configuration of a computer corresponding to at least one of the embodiments according to the present invention.

FIG. 7 is a block diagram showing a configuration of a computer 10D, which is an example of the computer 10 according to one embodiment of the present invention. In the present embodiment, the computer 10D at least includes an obtaining unit 11, a generating unit 12C, a determining unit 13, and a display unit 14D.

The display unit 14D has a function to display an image indicating a determination area in a display area corresponding to a direction of a controller, and display an image indicating a determination area, which becomes larger as a distance from the controller to the display area becomes shorter. Namely, the display unit 14D displays the image indicating the determination area so that the shorter the display area becomes, the larger the image becomes.

Here, a configuration of specifying a display area corresponding to a direction of the controller is not limited particularly. However, it is preferable to be a display area instructed by the controller.

Further, a configuration of the image indicating the determination area is not limited particularly. However, it is preferable that a user can recognize the image generated by an operation of the controller by the user. As an example of such a configuration, there is a configuration in which in a case where a plurality of users plays a video game in the same space, an image with a color assigned to each of the users is displayed.

Further, a configuration to display the image indicating the determination area larger as the distance from the controller to the display area becomes shorter is not limited particularly. For example, it may be configured so as to realize such display by a shape of the determination area in the virtual space, or may be configured so as to realize such display by adjusting the image when the image is displayed in the display area.

Figure 8:
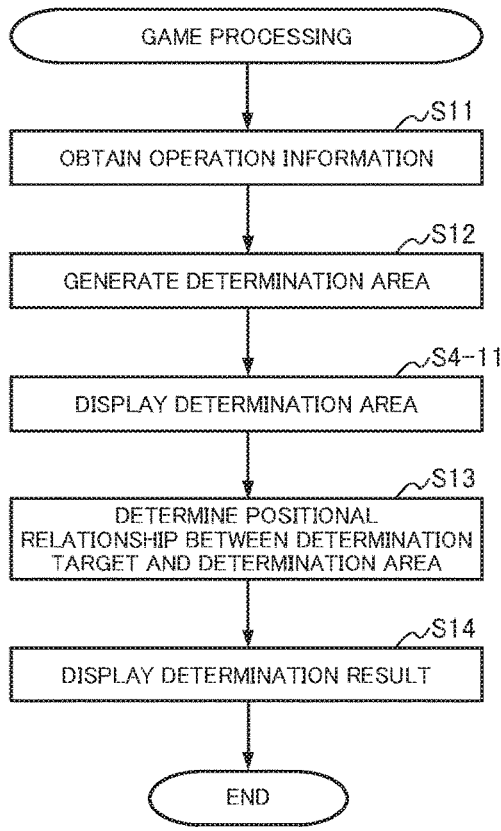
FIG. 8 is a flowchart showing an example of game processing corresponding to at least one of the embodiments according to the present invention.

FIG. 8 is a flowchart showing an example of game processing carried out by the computer 10D. When a determination area is generated, the computer 10D displays the generated determination area in the display area (Step S4-11). In the present embodiment, the computer 10D generates, in the virtual space, the determination area with a shape in which the determination area positioned on a projection plane corresponding to the display area positioned in the direction of the controller becomes larger as a coordinate indicating a position of the controller is closer to the projection plane.

As explained above, as one side of the fourth embodiment, the computer 10D is configured so as to include the obtaining unit 11, the generating unit 12C, the determining unit 13, and the display unit 14D. Thus, the display unit 14D displays the image indicating the determination area in the display area corresponding to the direction of the controller; and display the image indicating the determination area that becomes larger as the distance from the controller to the display area becomes shorter. Therefore, it is possible to encourage the user to operate the controller in the vicinity of the display area.

Fifth Embodiment

Figure 9:
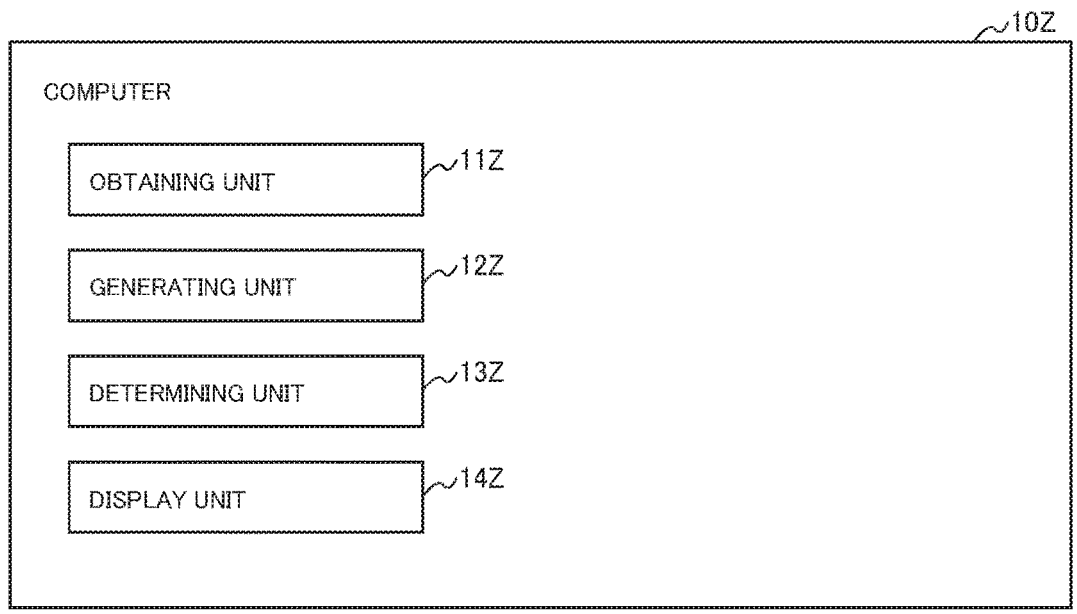
FIG. 9. is a block diagram showing an example of a configuration of a computer corresponding to at least one of the embodiments according to the present invention.

FIG. 9 is a block diagram showing a configuration of a computer 10Z, which is an example of the computer 10 according to one embodiment of the present invention. In the present embodiment, the computer 10Z at least includes an obtaining unit 11Z, a generating unit 12Z, a determining unit 13Z, and a display unit 14Z.

The computer 10Z has a function to control progress of a video game on the basis of an operation of a controller by a user in a predetermined space including a plurality of display areas. Hereinafter, in the present embodiment, the case where it is intended to create a music video game, in which the user experiences a video on a large screen by using a projector, to give the user completely new surprise, amusement, and emotion will be described.

Figure 10:
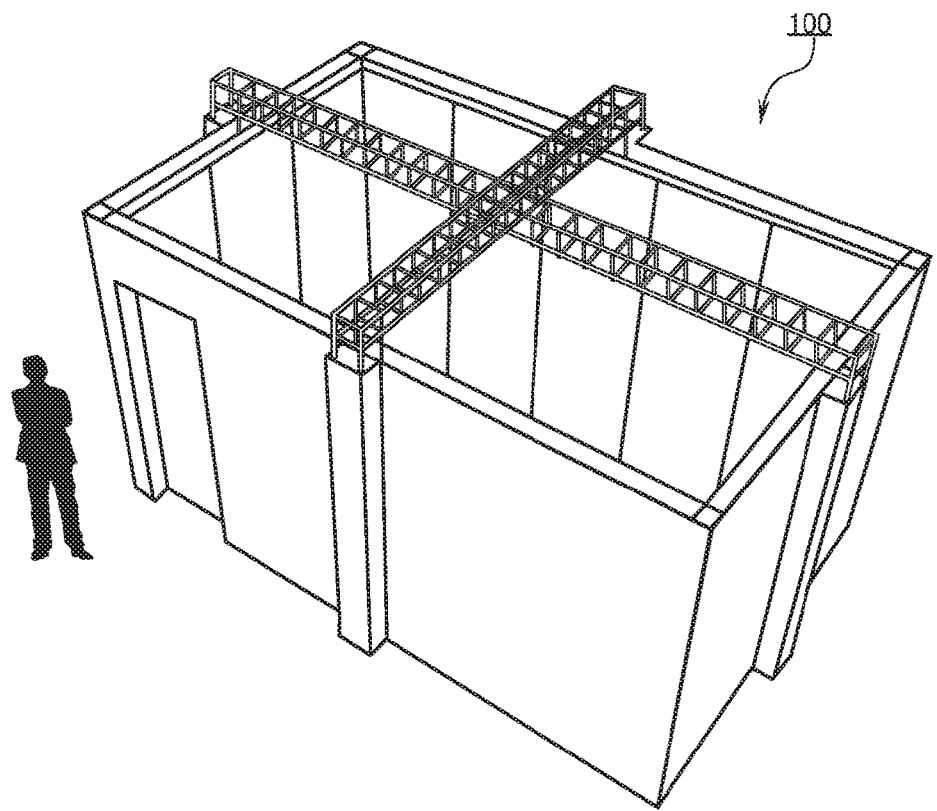
FIG. 10 is an explanatory drawing for explaining a game system when to carry out a music video game corresponding to at least one of the embodiments according to the present invention.

FIG. 10 is an explanatory drawing for explaining a game system 100 when the computer 10Z carries out the music video game. As shown in FIG. 10, the music video game according to the present embodiment is a music video game that is played in a booth in which a place is surrounded by four walls. Although it is not shown in the drawings, the predetermined number of projectors and the predetermined number of sensors are provided in the game system 100. A game image is projected on four walls and a floor. The user is allowed to play the music video game in a body sensory manner by using a function of a controller for VR (virtual reality; hereinafter, referred to as "VR controller").

Figure 11:
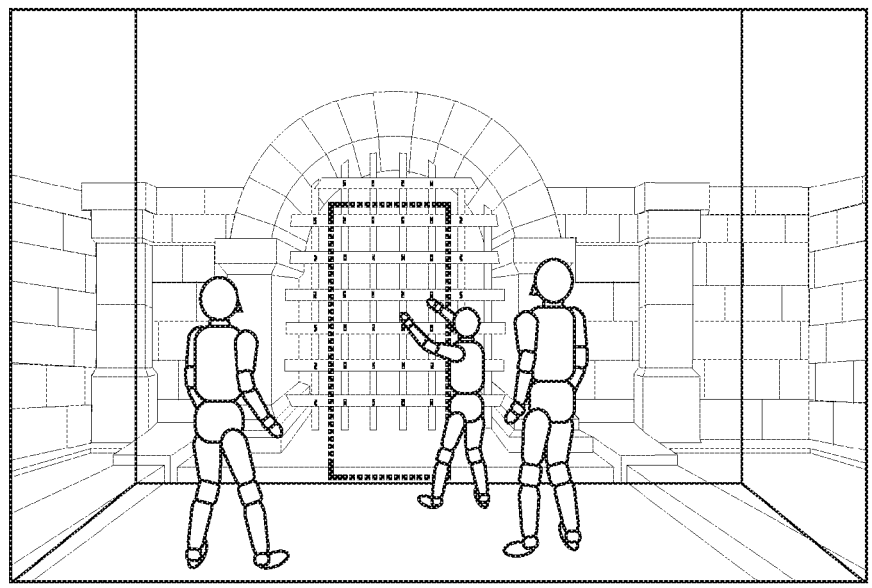
FIG. 11 is an explanatory drawing for explaining an example of a game screen corresponding to at least one of the embodiments according to the present invention.

FIG. 11 is an explanatory drawing for explaining an example of a game screen. As shown in FIG. 11, the game screen is displayed (or projected) on walls and a floor inside a booth.

Here, an outline of the music video game will be described. As basic elements, the music video game is one kind of music video game, and is a video game played by using a dedicated controller. A playing time is set (for example, four minutes), and the user is allowed to play the music video game by using different tunes (or different pieces of music) in the playing time several times (for example, two tunes). In this regard, the music video game may be configured so that courses are separated for every hour and plural sets of tunes exist as a plurality of patterns.

With respect to operability, it tended for the user to enjoy the music video game merely by shaking the controller. More specifically, notes are projected on a wall surface. The user timely shakes the controller against the notes to, and any of the notes can be hit to carry out representation, whereby it is possible for the user to experience a comfortable feeling. Further, among them, a playing using feet of the user, such as movement in a room, is also provided in order for the user to exercise. In particular, when to hit any of the notes, notes that can be hit by synchronization of the breathing by users who play the music video game together appear. Herewith, each of the users is allowed to feel closer to other users, and it is possible for the users to experience taking to each other and connection to other users.

Figure 12:
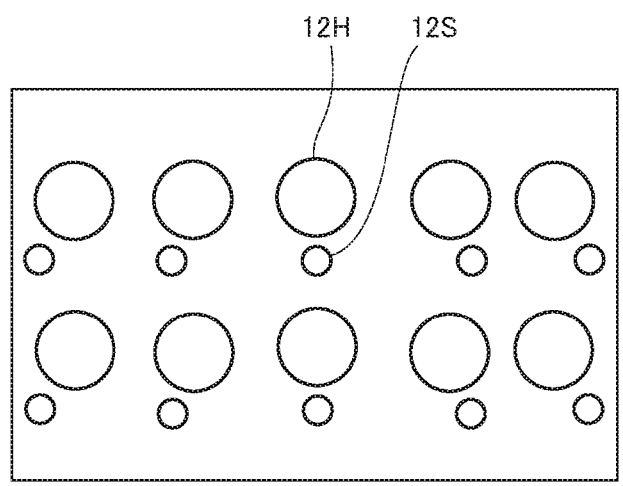
FIG. 12 is an explanatory drawing for explaining notes corresponding to at least one of the embodiments according to the present invention.

FIG. 12 an explanatory drawing for explaining the notes. Here, the notes mean objects to which the user takes an action in the music video game. By taking an action to any of notes, scoring, a sound effect, representation, and the like are carried out. When the user shakes the controller to hit any of the notes, it is regarded as success. In this regard, success determination will be described later.

The notes according to the present embodiment are positioned so as to be substantially faced to a wall, and come flying straight from a virtual three-dimensional space that is positioned beyond the wall. However, it is preferable that the notes are slightly tilted so that the user easily feels a sense of distance. Further, it is preferable that an angle at which the notes are tilted is made vertically and horizontally with the center of a booth as an axis. Further, it is preferable that an appearance position of the notes is not fixed to one place.

As shown in FIG. 12, a hit area 12H and a generation area 12S are provided in each of notes. It is preferable that speed at which notes moves (or comes) form the generation area 12S to the hit area 12H can be adjusted with a bar (or measure), beat, or 1/32 beats so as to match the beat of music.

It is assumed that a maximum of four users plays the music video game at the same time. The notes are classified by color for each of the users so that notes to be hit by each of the users can be identified by oneself. The same color as a user color becomes theme of the notes.

As the notes, plural kinds thereof are provided. Player notes are notes that are classified by respective player colors. The user can hit and play the player notes alone. Double notes are a single note that two users who become a pair can hit and play at the same time. However, determination of notes, an angle thereof, and the like are similar to those of the player notes, and the double notes are created by combining two player notes. It is preferable that combination of the corresponding pair is not limited particularly. Further, it is preferable that the double notes have a larger size than that of the player notes because two users play the music video game while neighboring with each other. Multi notes is a single note that all of the users can hit and play at the same time. The multi notes are caused to appear at the center of the wall. It is preferable that the multi notes have a size substantially the same as the whole screen because four players hit the multi notes while neighboring with each other. In a case where two notes appear at the same coordinate, they are set to double notes. As for the multi notes, a flag for the multi notes may be provided when a chart is created, and with respect to the notes to which the flag is attached, a sound effect, a hit particle, and the size may be dealt with in the similar manner to those of the multi notes.

Further, the computer 10Z may be configured so that with respect to notes that are set to be multi notes, when a chart is created, a flag (multi notes flag) is set so that the users can enjoy the music video game as well as the multi notes even in a case where the number of players is smaller. By configuring the computer 10Z in this manner, it is possible for the user or users to enjoy representation of the multi notes even when one user, two or more users play the music video game. A single note for the multi notes is a single note to which the flag for the multi notes is attached, and is used when one user plays the music video game alone. A size of the player notes is similar to that of the multi notes. It is preferable that a particle with a dedicated size is provided because there is possibility to look dirty in a case where one for the player notes is enlarged and diverted in place of the hit particle. A design thereof may be the same as that of the player notes. In this regard, it is preferable that those for all the player colors are provided. Double notes for multi notes are double notes to each of which the flag for the multi notes is attached, and is used when two users play the music video game. A size of the double notes is similar to that of the multi notes. In order to create the double notes for the multi notes, double notes with a medium size and a film, which covers the double notes, similar to the multi notes may be provided. It is preferable that a particle with a dedicated size is provided because there is possibility to look dirty in a case where one for the player notes is enlarged and diverted in place of the hit particle. A design thereof may be the same as that of the double notes. Multi notes for three users are dealt with as multi notes when the three users play the music video game. It is preferable that the multi notes are designed so as to involve three player notes. The hit particle, the size, and the like are similar to those of the multi notes.

In a case where it is determined to be success because the notes are hit, a hit particle is generated. There are two types as a status of the notes at the time of determination. A first status is success, and means a state that the user succeeds in hitting the notes. In this case, the hit particle is generated. Further, it may be configured so as to vibrate a controller. It is preferable that a particle according to a type of notes is prepared. A second status is failure, and means a state that the user fails to hit the notes. The notes go straight ahead as they are, and disappear when the notes completely pass by a determination position. It is preferable that the notes are designed so that the user is informed that a mistake is made at that time.

The computer 10Z may be configured so that arrangement of the notes introduces double notes and/or multi notes to a position at which the double notes and multi notes can be hit. By configuring the computer 10Z in this manner, it is possible to prevent the players from colliding with each other, and this makes it possible to heighten a sense of immersion in the virtual space.

Further, in order to easily find the notes better, an image by which a note to be next hit is taught to the user (hereinafter, referred to as a "note tracker") is displayed. Since the note tracker allows the user to understand the note to be next hit, the user hardly wonders when the user moves on a wall surface. Moreover, the computer 10Z may be configured so that in a case where the note tracker moves, a locus thereof is displayed. As the note tracker, there are three types according to the type of notes. It is preferable that the double notes and the multi notes are configured so that positions of colors can be changed in order that the users line up. The computer 10Z may be configured so that the note tracker becomes larger in the order of the player notes, the double notes, and the multi notes. Further, the computer 10Z may be configured so that a tracker for the double notes and a tracker for the multi notes stick together once and are then developed. The compute 10Z may be configured so that in order to further heighten visibility thereof, light blinks at the center of the tracker so that the user can understand an arrival point of the notes.

With respect to determination, the computer 10Z may be configured so as to relieve a size for hit determination of the notes without relieving a bar (or measure), a beat, or the like. Namely, the computer 10Z may be configured so as to enlarge a hit determination area. The hit determination regarding a size in a depth direction thereof may also be relieved in addition to a size in a lateral direction thereof. In this regard, it is preferable that the size or magnitude of the hit determination is configured so that it can be adjusted arbitrarily.

Further, the computer 10Z may be configured so that the hit particles are differentiated between the case where notes are hit with a correct distance and the case where the notes are hit with a separate distance. By configuring the computer 10Z in this manner, it is possible to teach a distance to play the music video game to the user.

Further, the computer 10Z may be configured so that a user pointer is displayed on a screen only when the controller is shaken at given speed or higher. A track when to shake the controller is displayed from a position on a straight line from the controller to a portion at which speed does not become determined like a laser pointer (an image in which the track when to shake the controller is displayed). Moreover, a thickness of a trail of the pointer is changed in accordance with a distance between the controller and a shaken wall. This is because a situation is created that it becomes easy for the user to play the music video game by approaching and shaking the wall and it becomes hard for the user to play the music video game by separating from the wall. Herewith, it is expected that the user further approaches the wall to play the music video game. The computer 10Z may be configured so that the trail is not displayed completely depending upon the distance. In this regard, a shape of the trail is not limited particularly. For example, the shape may be configured so as to become deformed in accordance with an elapsed time. Further, the computer 10Z may be configured so as to maintain the trail only for a predetermined time. By configuring the computer 10Z in this manner, it is possible to realize a music video game in which the user is allowed to carry out precede input.

Figure 13:
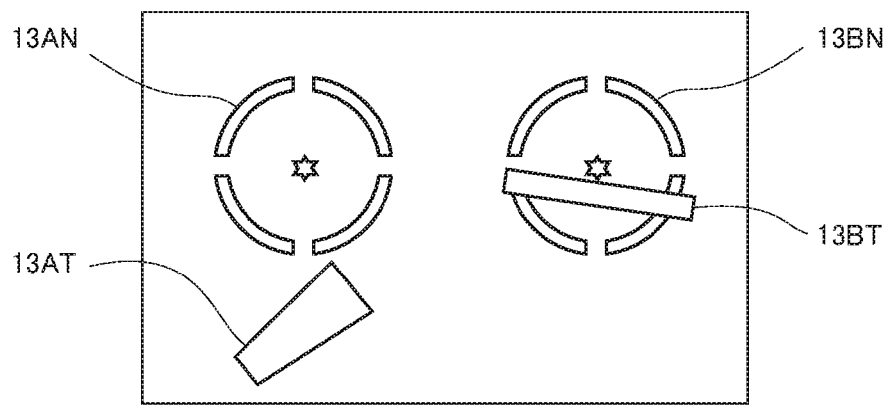
FIG. 13 is an explanatory drawing for explaining an example of a game screen corresponding to at least one of the embodiments according to the present invention.

FIG. 13 is an explanatory drawing for explaining an example of the game screen according to the present embodiment. As shown in FIG. 13, a note tracker 13AN, a trail 13AT, a note tracker 13BN, and a trail 13BT may be displayed on a game screen. The note tracker 13AN and the trail 13AT respectively correspond to a player A and an operation of the player A. The note tracker 13BN and the trail 13BT respectively correspond to a player B and an operation of the player B. In this regard, the trail 13AT is larger than the trail 13BT. This is because a distance from the player A to one wall is shorter than a distance from the player B to the one wall.

Next, the function of each unit of the computer 10Z will be described.

The obtaining unit 11Z has a function to obtain operation information that contains a position and a direction of the controller in a predetermined space. In the present embodiment, the obtaining unit 11Z obtains operation information that contains a position and a direction of the VR controller in a space in which a video is projected on walls and a floor of a room with 3 to 5 m as one side and identification information of the VR controller.

The generating unit 12Z has a function to generate, in a case where the position or the direction of the controller is changed, a determination area in a virtual space corresponding to the predetermined space on the basis of the operation information corresponding to the change. In the present embodiment, the generating unit 12Z generates the determination area by reflecting the change in the position or the direction of the VR controller to the virtual space with the same form as that of the predetermined space. In this regard, a shape of the determination area to be generated is not limited particularly. However, it is preferable that the shape is configured so as to include a position that is extended from a coordinate of the controller to a wall direction. By configuring the computer 10Z in this manner, it is possible to provide a feeling to operate the controller like a sword to the user, and this makes it possible to improve interest in or the taste of the video game.

The determining unit 13Z has a function to determine a positional relationship between a determination target and the determination area that are arranged in the virtual space. In the present embodiment, the determining unit 13Z determines whether a positional relationship between the notes and the trail of the pointer coincides or not.

The display unit 14Z has a function to display an image corresponding to a determination result in a display area. In the present embodiment, the display unit 14Z projects various kinds of images including the image regarding the determination result, such as representation in a case where the notes and the trail coincides, on the walls that constitute the predetermined space.

Next, an operation of the computer 10Z according to the present embodiment will be described.

Figure 14:
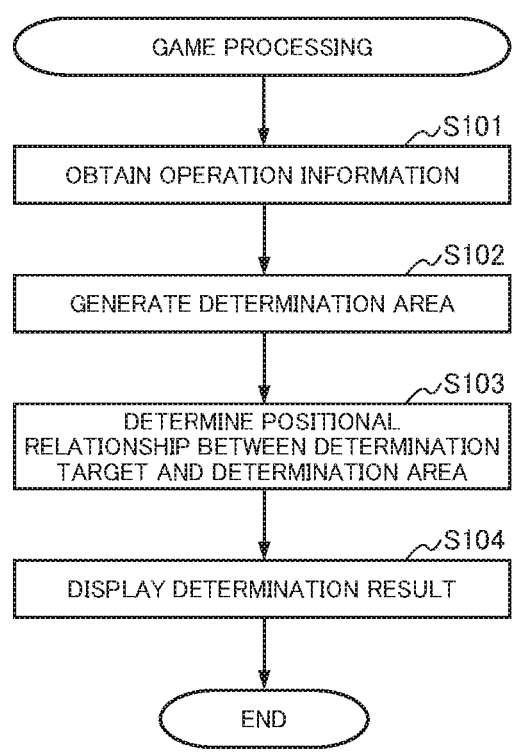
FIG. 14 is a flowchart showing an example of game processing corresponding to at least one of the embodiments according to the present invention.

FIG. 14 is a flowchart showing an example of game processing carried out by the computer 10Z. The game processing is started when the user satisfies a start condition of the video game, for example.

In the game processing, the computer 10Z first obtains operation information (Step S101). In the present embodiment, the computer 10Z projects game start representation in a booth, and then obtains operation information of the VR controller operated by each of a plurality of users who play the video game at the same time for each user.

When the operation information is obtained, the computer 10Z generates a determination area (Step S102). In the present embodiment, the computer 10Z generates a trail corresponding to an operation of the VR controller by each of the plurality of users.

When the determination area is generated, the computer 10Z determines a positional relationship between a determination target and the determination area (Step S103). In the present embodiment, the computer 10Z determines whether the trail generated in accordance with the operation of each of the users touches notes corresponding to each of the users or not.

When the positional relationship is determined, the computer 10Z displays an image corresponding to a determination result in a display area (Step S104), and terminates the processing herein. In the present embodiment, the computer 10Z displays a hit particle in a case where it is determined that the notes coincide with the trail.

As explained above, as one side of the fifth embodiment, the computer 10Z provided with the functions to control progress of the video game on the basis of the operation of the controller by the user in the predetermined space including the plurality of display areas is configured so as to include the obtaining unit 11Z, the generating unit 12Z, the determining unit 13Z, and the display unit 14Z. Thus, the obtaining unit 11Z obtains the operation information containing the position and the direction of the controller in the predetermined space; the generating unit 12Z generates, in a case where the position or the direction of the controller is changed, the determination area (for example, a trail of the user pointer) in the virtual space corresponding to the predetermined space on the basis of the operation information corresponding to the change; the determining unit 13Z determines the positional relationship between the determination target and the determination area that are arranged in the virtual space; and the display unit 14Z displays the image corresponding to the determination result in the display area. Therefore, it is possible to improve a sense of immersion in the virtual space.

Further, the computer 10Z may be configured so as to generate the determination area in a case where the change in the position or the direction of the controller satisfies a predetermined condition regarding speed. By configuring the computer 10Z in this manner, it is possible to prevent a determination area that is not intended by the user from being generated.

Further, a plurality of irradiating device each of which is configured to irradiate the predetermined space with infrared light under a predetermined rule may be provided in the predetermined space. In this case, the computer 10Z may be configured so as to obtain at least part of the operation information on the basis of a light receiving result by an infrared light sensor provided in the controller. By configuring the computer 10Z in this manner, it is possible to improve accuracy in obtaining the operation information even in case where a plurality of users plays the video game in the predetermined space at the same time. Namely, even in a case where one user is hidden by another user with respect to one sensor, it is possible to obtain operation information of the hidden user by another sensor.

Further, the computer 10Z may be configured so as to: cause the determination target to appear in accordance with music that is outputted in the video game; and evaluate the user on the basis of the determination result by the determining unit 13Z. By configuring the computer 10Z in this manner, it is possible to provide a virtual space with a high sense of immersion to the user as the music video game.

Further, the computer 10Z may be configured to display an image for indicating a position of a determination target (hereinafter, referred to as an "indication image"; for example, note tracker) to the user so that a size thereof is not changed in a display area. By configuring the computer 10Z in this manner, it is possible to heighten visibility of the indication image that is displayed in the display area compared with the case where an object corresponding to the indication image is moved so as to keep the same distance with respect to one point of the virtual space.

Further, the computer 10Z may be configured so as to: obtain operation information of each of a plurality of controllers that is positioned in a predetermined space so that the operation information can be identified; generate a determination area corresponding to each of the controllers; and determine a positional relationship between a determination target corresponding to each of the controllers and the determination area corresponding to the corresponding controller. By configuring the computer 10Z in this manner, it is possible to improve a sense of immersion in the same virtual space by the plurality of users. In this case, the computer 10Z may further be configured so as to: display an image for indicating a position of a determination target corresponding to each of the controllers to the user (for example, note tracker) so that the corresponding controller can be identified (for example, classification by colors); and display, in a case where the images corresponding to the plurality of controllers overlap with each other, an image corresponding to the plurality of controllers in place of the image corresponding to each of the controllers. By configuring the computer 10Z in this manner, it is possible to heighten operability of each of the users at the time of multi-play.

As explained above, one or two or more shortages can be solved by each of the embodiments according to the present application. In this regard, the effects by each of the embodiments are non-limiting effects or one example of the non-limiting effects.

In this regard, in each of the embodiments described above, the computer 10 carries out the various kinds of processes described above in accordance with various kinds of control programs (for example, a video game processing program) stored in a storage device included in the computer 10.

Further, the configuration of the computer 10 is not limited to any of the configurations that have been explained as the example of each of the embodiments described above. For example, the computer 10 may be configured so that a server carries out a part or all of the processes that have been explained and a client carries out the remaining processes. Further, the computer 10 may be configured so that the server includes apart or all of the storing sections included in the computer 10. Namely, the computer 10 may be configured by a plurality of apparatuses or devices.

(Appendix)

The explanation of the embodiments described above has been described so that the following inventions can be at least realized by a person having a normal skill in the art to which the present invention belongs.

(1)

A non-transitory computer-readable medium including a video game processing program product for causing a computer to realize functions to control progress of a video game on a basis of an operation of a controller by a user in a predetermined space including a plurality of display areas, wherein the functions include:

an obtaining function configured to obtain operation information, the operation information containing a position and a direction of the controller in the predetermined space;

a generating function configured to generate, in a case where the position or the direction of the controller is changed, a determination area in a virtual space corresponding to the predetermined space on the basis of the operation information corresponding to the change;

a determining function configured to determine a positional relationship between a determination target and the determination area that are arranged in the virtual space; and a displaying function configured to display an image corresponding to a determination result in the display area.

(2)

The non-transitory computer-readable medium according to (1), wherein the generating function includes a function configured to generate the determination area having a shape corresponding to a locus of the change in the position or the direction of the controller.

(3)

The non-transitory computer-readable medium according to (1) or (2), wherein the functions further include:

a controlling function configured to control a position of the determination target in accordance with progress of the video game, and wherein the generating function includes a function configured to generate the determination area that is maintained only for a predetermined period of time from a time when the determination area is generated.

(4)

The non-transitory computer-readable medium according to any one of (1) to (3), wherein the displaying function includes a function configured to: display an image representing the determination area on the display area corresponding to a direction of the controller; and display the image representing the determination area so that the shorter a distance from the controller to the display area becomes, the larger the image becomes.

(5)

The non-transitory computer-readable medium according to any one of (1) to (4), wherein the generating function includes a function configured to generate the determination area in a case where the change in the position or the direction of the controller satisfies a predetermined condition regarding speed thereof.

(6)

The non-transitory computer-readable medium according to any one of (1) to (5), wherein a plurality of irradiating devices is provided in the predetermined space, each of the irradiating devices being configured to irradiate the predetermined space with infrared light under a predetermined rule, and wherein the obtaining function includes a function configured to obtain at least part of the operation information on the basis of a light receiving result by an infrared light sensor provided in the controller.

(7)

The non-transitory computer-readable medium according to any one of (1) to (6), wherein the functions further include:

an appearing function configured to cause the determination target to appear in accordance with music that is outputted in the video game; and an evaluating function configured to evaluate the user on the basis of the determination result by the determining function.

(8)

The non-transitory computer-readable medium according to any one of (1) to (7), wherein the displaying function includes a function configured to display an image for indicating a position of the determination target to the user so that a size of the image is not changed in the display area.

(9)

The non-transitory computer-readable medium according to any one of (1) to (8), wherein the obtaining function includes a function configured to obtain operation information of each of a plurality of controllers that is positioned in the predetermined space so that the operation information can be identified, wherein the generating function includes a function configured to generate a determination area corresponding to each of the controller, and wherein the determining function includes a function configured to determine a positional relationship between the determination target corresponding to each of the controllers and the determination area corresponding to the corresponding controller.

(9-1)

The non-transitory computer-readable medium according to (9), wherein the displaying function includes:

a function configured to display an image indicating a position of a determination target corresponding to each of the controllers to the user so that the corresponding controller can be identified; and a function configured to display, in a case where the images corresponding to the plurality of controllers overlap with each other, an image corresponding to the plurality of controllers in place of the image.

(10)

A computer into which the video game processing program product contained in the non-transitory computer-readable medium according to any one of (1) to (9-1) is installed.

(11)

A video game processing method of controlling progress of a video game on the basis of an operation of a controller by a user in a predetermined space including a plurality of display areas, the video game processing method comprising:

an obtaining process configured to obtain operation information, the operation information containing a position and a direction of the controller in the predetermined space;

a generating process configured to generate, in a case where the position or the direction of the controller is changed, a determination area in a virtual space corresponding to the predetermined space on the basis of the operation information corresponding to the change;

a determining process configured to determine a positional relationship between a determination target and the determination area that are arranged in the virtual space; and a displaying process configured to display an image corresponding to a determination result in the display area.

(12) A video game processing method carried out by a video game processing system to control progress of a video game on the basis of an operation of a controller by a user in a predetermined space including a plurality of display areas, the video game processing system comprising a communication network, a server, and a user terminal, the video game processing method comprising:

an obtaining process configured to obtain operation information, the operation information containing a position and a direction of the controller in the predetermined space;

a generating process configured to generate, in a case where the position or the direction of the controller is changed, a determination area in a virtual space corresponding to the predetermined space on the basis of the operation information corresponding to the change;

a determining process configured to determine a positional relationship between a determination target and the determination area that are arranged in the virtual space; and a displaying process configured to display an image corresponding to a determination result in the display area.

(13) A video game processing system for controlling progress of a video game on a basis of an operation of a controller by a user in a predetermined space including a plurality of display areas, the video game processing system comprising a communication network, a server, and a client, the video game processing system comprising:

an obtaining unit configured to obtain operation information, the operation information containing a position and a direction of the controller in the predetermined space;

a generating unit configured to generate, in a case where the position or the direction of the controller is changed, a determination area in a virtual space corresponding to the predetermined space on the basis of the operation information corresponding to the change;

a determining unit configured to determine a positional relationship between a determination target and the determination area that are arranged in the virtual space; and a displaying unit configured to display an image corresponding to a determination result in the display area.

According to one of the embodiments of the present invention, it is useful to improve a sense of immersion in a virtual space.

What is claimed is:

1. A non-transitory computer-readable medium including a video game processing program product for causing a computer to realize functions to control progress of a video game on a basis of an operation of a controller by a user in a predetermined space including a display area, the functions comprising:

an obtaining function configured to obtain operation information, the operation information containing a position or a direction of the controller in the predetermined space;

a generating function configured to generate, in a case where the position or the direction of the controller is changed, a determination area in a virtual space corresponding to the predetermined space on a basis of the operation information corresponding to the change; and a displaying function configured to display an image corresponding to a positional relationship between a determination target and the determination area in the display area.

2. The non-transitory computer-readable medium according to claim 1, wherein the determination area has a shape corresponding to a locus of the change in the position or the direction of the controller.

3. The non-transitory computer-readable medium according to claim 1, the functions further comprising:

a controlling function configured to control a position of the determination target in accordance with progress of the video game, and wherein the determination area is maintained only for a predetermined period of time from a time when the determination area is generated.

4. The non-transitory computer-readable medium according to claim 1, wherein the displaying function is further configured to: display a second image representing the determination area on the display area corresponding to the direction of the controller; and display the second image representing the determination area so that the shorter a distance from the controller to the display area becomes, the larger the image becomes.

5. The non-transitory computer-readable medium according to claim 1, wherein the generating function is configured to generate the determination area in the case where the change in the position or the direction of the controller satisfies a predetermined condition regarding speed thereof.

6. The non-transitory computer-readable medium according to claim 1, wherein a plurality of irradiating devices is provided in the predetermined space, each of the plurality of irradiating devices being configured to irradiate the predetermined space with infrared light under a predetermined rule, and the obtaining function is configured to obtain at least a part of the operation information on a basis of a light receiving result received by an infrared light sensor provided in the controller.

7. The non-transitory computer-readable medium according to claim 1, the functions further comprising:

an appearing function configured to cause the determination target to appear in accordance with music that is output in the video game; and an evaluating function configured to evaluate the user on a basis of the positional relationship between the determination target and the determination area.

8. The non-transitory computer-readable medium according to claim 1, wherein the displaying function is further configured to display a second image for indicating a position of the determination target to the user so that a size of the second image is not changed in the display area.

9. The non-transitory computer-readable medium according to claim 1, wherein the obtaining function is further configured to obtain second operation information of each of a plurality of controllers that is positioned in the predetermined space so that the operation information can be identified, the generating function is further configured to generate determination areas corresponding to the plurality of controllers, and a determining function is configured to determine positional relationships between determination targets corresponding to the plurality of controllers and determination areas corresponding to the plurality of controllers.

10. The non-transitory computer-readable medium according to claim 9,
wherein the displaying function is further configured to:
display images indicating positions of the determination targets corresponding to the plurality of controllers to the user so that the plurality of controllers can be identified; and
display, in a case where the images corresponding to the plurality of controllers overlap with each other, a second image corresponding to the plurality of controllers in place of the images.

11. A video game processing method of controlling progress of a video game on a basis of an operation of a controller by a user in a predetermined space including a display area, the video game processing method comprising:
obtaining operation information, the operation information containing a position or a direction of the controller in the predetermined space;
generating, in a case where the position or the direction of the controller is changed, a determination area in a virtual space corresponding to the predetermined space on a basis of the operation information corresponding to the change;
and
displaying an image corresponding to a positional relationship between a determination target and the determination area in the display area.

12. A video game processing system for controlling progress of a video game on a basis of an operation of a controller by a user in a predetermined space including a display area, the video game processing system comprising:
a server; and
a client terminal connected to the server via a communication network, wherein the server and the client terminal are configured to perform operations including:
obtaining operation information, the operation information containing a position or a direction of the controller in the predetermined space;
generating, in a case where the position or the direction of the controller is changed, a determination area in a virtual space corresponding to the predetermined space on a basis of the operation information corresponding to the change;
and
displaying an image corresponding to a positional relationship between a determination target and the determination area in the display area.

* * * * *